(12) United States Patent
Junior

(10) Patent No.: US 12,001,870 B2
(45) Date of Patent: Jun. 4, 2024

(54) INJECTION AND EXECUTION OF WORKLOADS INTO VIRTUAL MACHINES

(71) Applicant: Red Hat, Inc., Raleigh, NC (US)

(72) Inventor: Cleber Rosa Junior, Manchester, NH (US)

(73) Assignee: RED HAT. INC., Raleigh, NC (US)

( * ) Notice: Subject to any disclaimer, the term of this patent is extended or adjusted under 35 U.S.C. 154(b) by 465 days.

(21) Appl. No.: 17/214,108

(22) Filed: Mar. 26, 2021

(65) Prior Publication Data

US 2022/0308907 A1   Sep. 29, 2022

(51) Int. Cl.
*G06F 9/455* (2018.01)
*G06F 9/50* (2006.01)

(52) U.S. Cl.
CPC .......... *G06F 9/45558* (2013.01); *G06F 9/505* (2013.01); *G06F 9/5077* (2013.01); *G06F 2009/4557* (2013.01); *G06F 2009/45575* (2013.01); *G06F 2009/45595* (2013.01)

(58) Field of Classification Search
CPC .... G06F 9/45558; G06F 9/505; G06F 9/5077; G06F 2009/4557; G06F 2009/45575; G06F 2009/45595
See application file for complete search history.

(56) References Cited

U.S. PATENT DOCUMENTS

| | | | |
|---|---|---|---|
| 10,284,416 B2 | 5/2019 | Srinivasan | |
| 2014/0230024 A1* | 8/2014 | Uehara | H04L 63/1433 726/4 |
| 2015/0134792 A1* | 5/2015 | Zhang | H04L 41/50 709/221 |
| 2016/0234250 A1* | 8/2016 | Ashley | H04L 63/20 |
| 2017/0024260 A1 | 1/2017 | Chandrasekaran et al. | |
| 2017/0255890 A1* | 9/2017 | Palavalli | G06Q 10/06 |
| 2017/0364377 A1* | 12/2017 | Koller Jemio | G06F 8/54 |
| 2019/0018715 A1* | 1/2019 | Behrendt | G06F 8/71 |
| 2020/0092271 A1 | 3/2020 | Kumar et al. | |

(Continued)

FOREIGN PATENT DOCUMENTS

| | | |
|---|---|---|
| CN | 105279000 B | 6/2019 |
| CN | 106528263 B | 8/2019 |

OTHER PUBLICATIONS

Bolte, Matthias et al., "Non-Intrusive Virtualization Management using Libvirt", pp. 1-6, 2010, RF Paderborn Center for Parallel Computing PC2, University of Paderborn, Fürstenallee 11, 33102, Paderborn, Germany; 978-3-9810801-6-2/DATE10, 2010 EDAA—6 Pages.

(Continued)

*Primary Examiner* — Dong U Kim

(57) ABSTRACT

A system includes a processor in communication with a memory, a virtual machine running on the processor, and a hypervisor. The hypervisor is configured to receive a workload definition file ("WDF"). The WDF is associated with a workload, and the WDF is packaged such that the WDF is configured to generate a workload definition device ("WDD"). Additionally, the hypervisor is configured to receive a request to deploy the WDD within the virtual machine. The request includes the WDF. The hypervisor is also configured to deploy the WDD within the virtual machine. The WDD is configured to automatically execute the workload responsive to meeting at least one execution criteria.

19 Claims, 7 Drawing Sheets

(56) References Cited

U.S. PATENT DOCUMENTS

2020/0134171 A1* 4/2020 Li ........................ G06F 9/45558
2020/0257794 A1* 8/2020 Kim ...................... G06F 21/606
2021/0149740 A1* 5/2021 Jia .......................... H04L 67/10

OTHER PUBLICATIONS

Li, Chunxiao et al., "A Trusted Virtual Machine in an Untrusted Management Environment", pp. 472-482, Oct.-Dec. 2012, IEEE Transactions on Services Computing, vol. 5, No. 4—12 Pages.

* cited by examiner

INJECTION AND EXECUTION OF WORKLOADS INTO VIRTUAL MACHINES

BACKGROUND

Trusted execution environments, such as virtual machines may be used to emulate all or a portion of a computer system. Virtualization may be achieved by running a software layer, often referred to as a hypervisor, above the hardware and below the trusted execution environment, such as guest virtual machines. A hypervisor may run directly on the server hardware without an operating system beneath it or as an application running on a traditional operating system. A hypervisor may virtualize the physical layer and provide interfaces between the underlying hardware and trusted execution environments. Virtual machines allow running various software modules, for example, multiple operating systems, concurrently and in isolation from other software modules, on one or more interconnected physical computer systems. In some instances, virtual machines may be used to execute workloads.

SUMMARY

The present disclosure provides new and innovative systems, methods and techniques for injection and execution of workloads into trusted execution environments, such as a virtual machines ("VMs"). In an example, a system includes a processor in communication with a memory, a hypervisor, and a virtual machine running on the processor. The hypervisor is configured to receive a workload definition file ("WDF"). The WDF is associated with a workload, and the WDF is packaged such that the WDF is configured to generate a workload definition device ("WDD"). Additionally, the hypervisor is configured to receive a request to deploy the WDD within the virtual machine. The request includes the WDF. The hypervisor is also configured to deploy the WDD within the virtual machine. The WDD is configured to automatically execute the workload responsive to meeting at least one execution criteria.

In an example, a method includes receiving, by a hypervisor, a workload definition file (WDF). The WDF is associated with a workload, and the WDF is packaged such that the WDF is configured to generate a workload definition device (WDD). Additionally, the method includes receiving, by the hypervisor, a request to deploy the WDD within a virtual machine. The request includes the WDF. The method also includes deploying, by the hypervisor, the WDD within the virtual machine. The WDD is configured to automatically execute the workload responsive to meeting at least one execution criteria.

In an example, a non-transitory machine-readable medium stores code, which when executed by a processor is configured to receive a workload definition file (WDF). The WDF is associated with a workload, and the WDF is packaged such that the WDF is configured to generate a workload definition device (WDD). The non-transitory machine-readable medium is also configured to receive a request to deploy the WDD within a virtual machine. The request includes the WDF. Additionally, the non-transitory machine-readable medium is configured to deploy the WDD within the virtual machine. The WDD is configured to automatically execute the workload responsive to meeting at least one execution criteria.

Additional features and advantages of the disclosed method and apparatus are described in, and will be apparent from, the following Detailed Description and the Figures.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
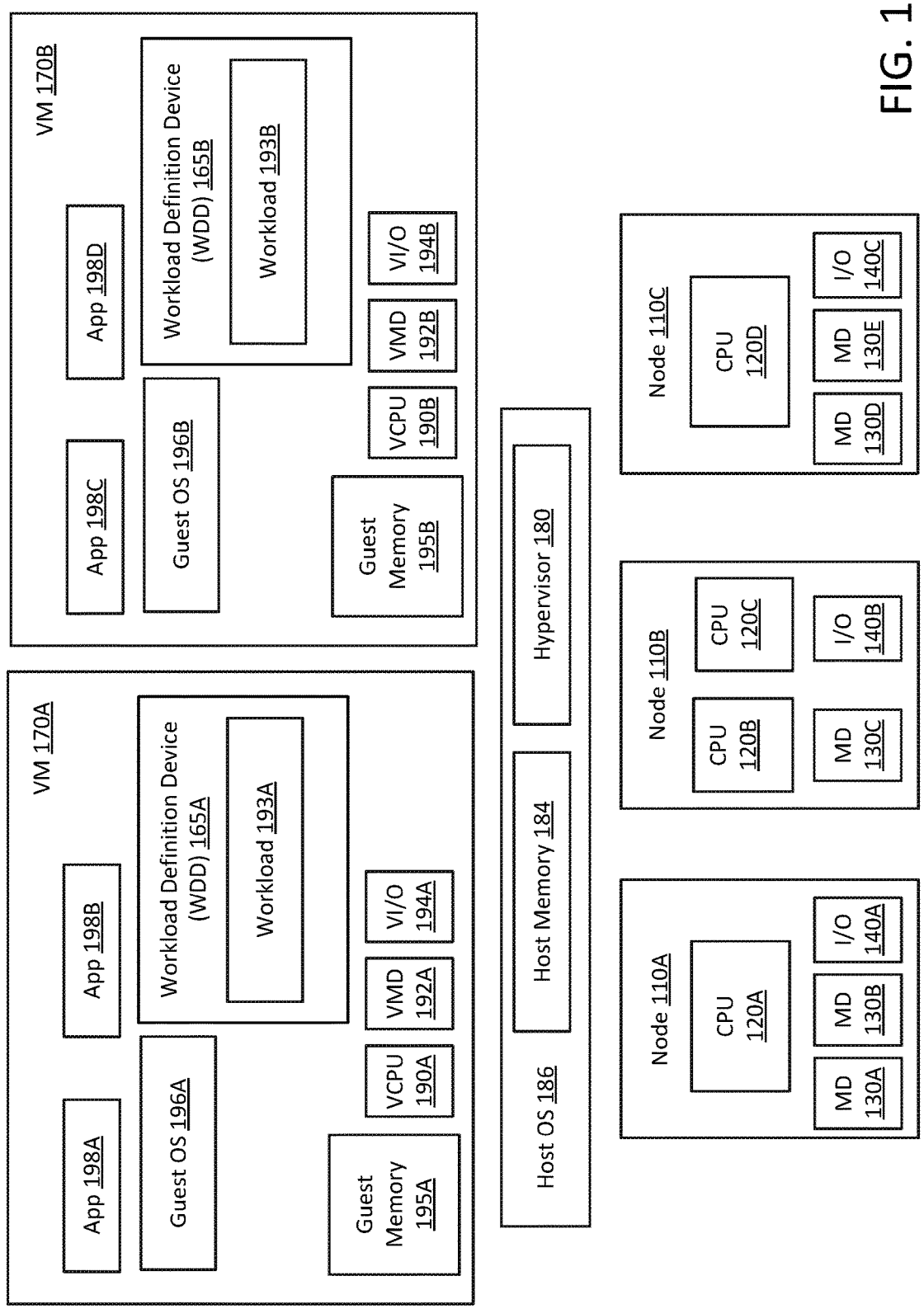
FIG. 1 illustrates a block diagram of an example computer system according to an example embodiment of the present disclosure.

Systems, methods and techniques are disclosed for injection and execution of workload(s) into trusted execution environments ("TEEs"), such as a virtual machines ("VMs"). The execution of workloads in isolated virtual machine environments is often leveraged as it is quicker than bare-metal provisioning. With bare-metal provisioning, a server (e.g., bare-metal server) only hosts one tenant or consumer, which differs from servers that can host multiple tenants and which utilize virtualization and cloud hosting. For example, bare-metal provisioning often involves installing an operating system ("OS") or a "type 1" hypervisor directly on a computer's hardware. When a hypervisor is installed directly on the hardware of a physical machine, between the hardware and the OS, it is called a "bare-metal" hypervisor or a "type 1" hypervisor. Some bare-metal hypervisors are embedded into the firmware at the same level as the motherboard basic input/output system (BIOS), which may be necessary for some systems to enable the operating system on a computer to access and use virtualization software. The "type 1" hypervisor or bare-metal hypervisor runs directly on the hardware that hosts guest operating systems. Because the bare-metal hypervisor(s) separates the OS from the underlying hardware, the software no longer relies on or is limited to specific hardware devices or drivers. This means bare-metal hypervisors allow OSs and their associated applications to run on a variety of types of hardware. They also allow multiple operating systems and virtual machines (guest machines) to reside on the same physical server (host machine).

In most cases, the VM needs to be probed for its state (e.g., is the VM up and running?) through an active connection before execution of a workload can begin. In an example, the VM may be probed by various agents, such as a customer, client, a proxy thereof, a hypervisor or an owner of the VM. Agents may be entities that listen for requests (usually network based) and may perform actions such as executing a workload on behalf of a client. Specifically, various outside agents may probe or scan the VM to obtain state information about the VM. For example, the outside agents may need to confirm that the VM is in a running state before initiating workload execution. Additionally, the outside agents may need to continually confirm that the VM is in a state (e.g., running instead of shutdown) that allows for workload execution. In a specific example, the hypervisor may continuously probe or poll the VM for its state until there is a confirmation that workload execution has been completed.

Establishing the active connection (e.g., a connection based on network based remote access protocols like Secure Shell ("SSH") or a simulation of a human manually connecting the VM to a console device) and probing the VM for its state may be error prone and may require additional infrastructure for the sole purpose of starting and executing the workload. For example, each of the following—(i) establishing the secure connection, (ii) probing the VM, such as sending a communication to the VM, for its state, and (iii) receiving a response from the VM regarding its state—adds an additional layer or point of failure before execution of the workload can begin. The complexities involved with batch work or batch workloads adds to the risk of errors as batch work often adds additional processing, coordination and network traffic, each having their own layers or points of failure, which typically leads to an overuse of resources to support the additional infrastructure for supporting the starting and execution of workloads.

In some cases, the additional infrastructure and use of resources may conflict with the goal of the workload. For instance, the workload may be configured such that additional interrupts are prevented from interfering with the workload. However, these interrupts may be from networking or console device access, which are used to establish the active connection or determining the present state of the VM.

By defining and packaging the workload (e.g., all requirements of the workload) to be executed in terms of a device, and adding the package to the VM, communication(s) from outside of the VM are unnecessary. The workload may be defined and packaged such that from a host's perspective, the packaged files appear as a single file and from a guest's perspective, the packaged files appear as a bit by bit representation of a file system. The defined workload may be packaged with any other supporting files, dependencies, libraries, etc., such that the packaged files create a workload definition device, such as a block device. As noted above, the block device may be viewed as a single file from the host's perspective. In the guest's perspective, the WDF is viewed as a disk device, such as the block device. Once mapped to disk, the packaged workload (e.g., block device) would represent a file system having metadata indicating what to execute, what outputs to generate, where to save the generated outputs, etc. Specifically, the disk device or block device (from the guest's perspective) is transparently and universally supported by the OS's drivers and other OS capabilities.

An illustrative example of defining, creating and/or packaging a workload includes: (a) creating an empty file on the client side and populating the empty file with a file system; (b) obtaining, from the client, information regarding the workload to be executed, e.g., either by obtaining location information of a pre-existing application in the VM 170 or by obtaining location information of an application within the client's file system; and (c) creating metadata pointing to the either the location within the VM 170 (e.g., "/usr/bin/applications" or copying the application on the guest to the file system and creating the metadata pointing to a relative location within the WDF or WDD.

In an example, (a) may be performed by the following commands and instructions:
 dd if=/dev/zero
 ob=wdf.img
 bs=1M
 count=256

Additionally, (c) may be performed by the following commands and instructions where a file is named "/mnt/wdd-filesystem/metadata" that contains an entry point ("path=/usr/bin/application"). Furthermore, copying the application on the guest to the file system may be achieved via "cp/usr/bin/application/mnt/wdd-filesystem/application" and by creating a file named "/mnt/wdd-filesystem/metadata" that contains the entry point ("path=application").

Specifically, probing the VM for its state and establishing an active connection become unnecessary. By eliminating the need for (i) establishing the secure connection, (ii) probing the VM, such as sending a communication to the VM, for its state, and (iii) receiving a response from the VM regarding its state, several of the associated layers or points of failure are advantageously eliminated thereby providing a less error prone system. Additionally, the device (e.g., the workload packaged to be executed as the device) may be treated as an output device, which may then record the output generated by the workload. Typically, an application may generate a first output (e.g., standard output "STOUT") and a second output (e.g., standard error "STDERR"). In an example, execution of the workload may be implemented as executing the application defined at the path key under the entry point, and saving the contents produced at the STDOUT on a file called "output/stdout" and the STDERR on a file called "output/stderr". When execution is complete and the WDF is retrieved, the client may access the results via "/mnt/wdd-filesystem/output/stdout" and "/mnt/wdd-filesystem/output/stderr".

FIG. 1 depicts a high-level component diagram of an example computing system 100 in accordance with one or more aspects of the present disclosure. The computing system 100 may include an operating system (e.g., host OS 186), one or more TEEs (e.g., VMs 170A-B) and nodes (e.g., nodes 110A-C).

As noted above, the TEE may be a virtual machine (e.g., VMs 170A-B) and may include a workload definition device ("WDD") 165A-B. The WDDs may include respective workloads 193A-B. As illustrated in FIG. 1, each VM 170A-B may include a respective WDD 165A-B and may execute a workload 193A-B. The VMs 170A-B may also include a guest OS, guest memory, a virtual CPU (VCPU), virtual memory devices (VMD), and virtual input/output devices (VI/O). For example, VM 170A may include guest OS 196A, guest memory 195A, a virtual CPU 190A, a virtual memory device(s) 192A, and virtual input/output device(s) 194A. Virtual machine memory 195A may include one or more memory pages. Similarly, VM 170B may include runtime 193B, guest OS 196B, guest memory 195B, a virtual CPU 190B, virtual memory device(s) 192B, and virtual input/output device(s) 194B.

The computing system 100 may also include a hypervisor 180 and host memory 184. The hypervisor 180 may manage host memory 184 for the host operating system 186 as well as memory allocated to the TEEs (e.g., VMs 170A-B) and guest operating systems (e.g., guest OS 196A such as guest memory 195A provided to guest OS 196A). Host memory 184 and guest memory 195A may be divided into a plurality of memory pages that are managed by the hypervisor 180. Guest memory 195A allocated to the guest OS 196A may be mapped from host memory 184 such that when an application 198A-D uses or accesses a memory page of guest memory 195A, the guest application 198A-D is actually using or accessing host memory 184.

In an example, a VM (e.g., VM 170A) may execute a guest operating system 196A and run applications 198A-B which may utilize the underlying VCPU 190A, VMD 192A, and VI/O device 194A. For example, one or more applications 198A-B may be running on VM 170A under the respective guest operating system 196A. VMs 170A-B may run on any type of dependent, independent, compatible, and/or incompatible applications on the underlying hardware and OS. In an example, applications (e.g., App 198A-B) run on a VM may be dependent on the underlying hardware and/or OS 186. In another example, applications 198A-B run on a VM may be independent of the underlying hardware and/or OS 186. For example, applications 198A-B running on VM 170A may be dependent on the underlying hardware and/or OS 186 while applications (e.g., Apps 198C-D) running on VM 170B are independent of the underlying hardware and/or OS 186. Additionally, applications 198A-B running on VM 170A may be compatible with the underlying hardware and/or OS 186. In an example, applications 198A-B running on VM 170A may be incompatible with the underlying hardware and/or OS 186.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect ("PCI") device, storage devices, disk drives, sound or video adaptors, photo/video cameras, printer devices, keyboards, displays, etc. The VMs 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D, may be provided by one or more local buses of suitable architecture, for example, peripheral component interconnect (PCI).

Figure 2A:
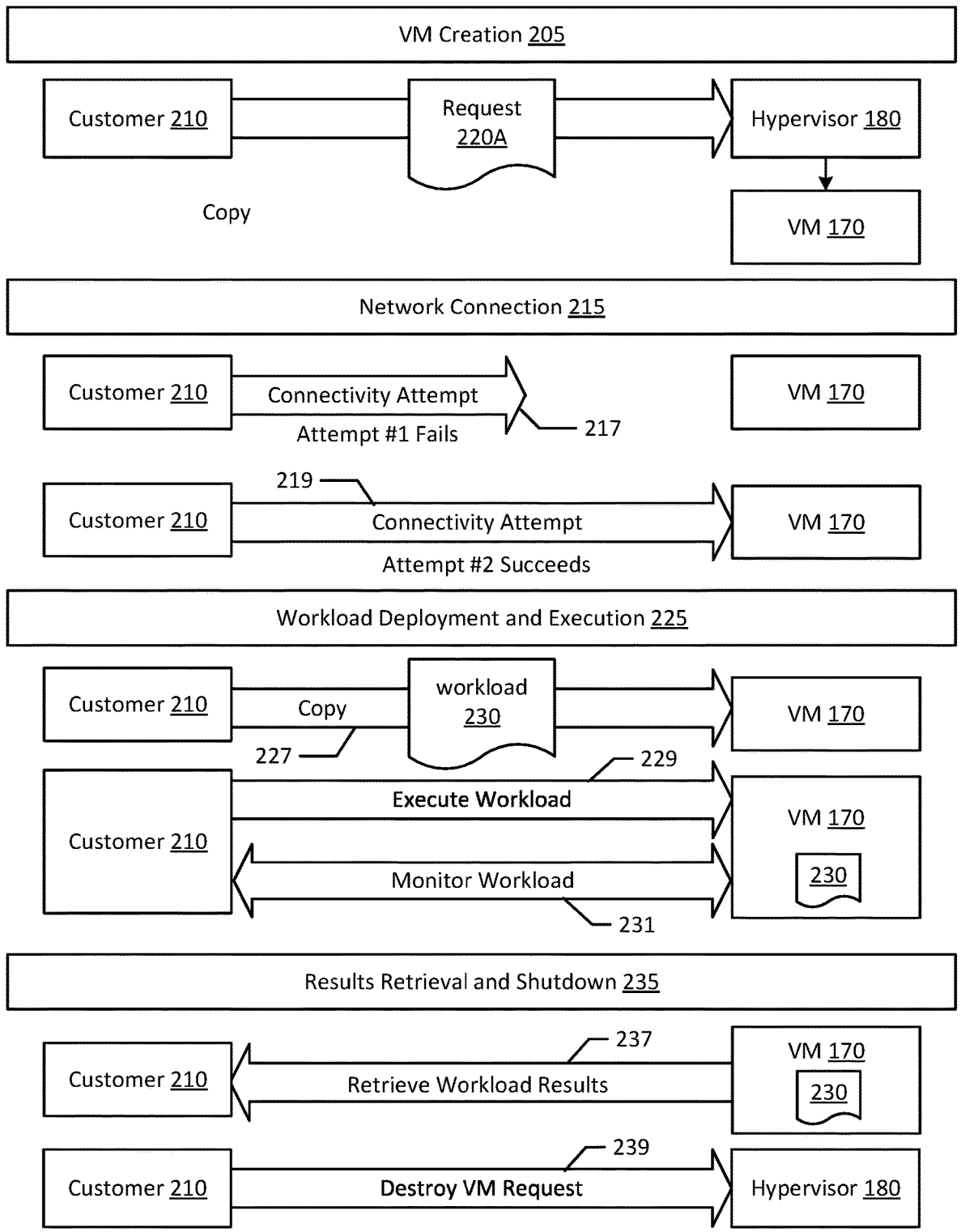
FIGS. 2A-B illustrate block diagrams of examples including traditional and optimized flows of executing a workload in a virtual machine according to an example embodiment of the present disclosure.

FIG. 2A illustrates a block diagram illustrating a traditional flow of executing a workload in a VM 170. As illustrated in FIG. 2A, the flow begins with VM creation (block 205). When creating a VM 170, a customer 210 may send a request 220A to a hypervisor 180 to create VM 170. After the VM 170 is created, network connectivity is possible where a network connection may be established (block 215). For example, network connectivity is possible as there is now a path, route or channel (e.g., communication channel) between the customer 210 and the newly created VM 170. In the illustrated example, the customer 210 attempts to establish connection with VM 170 (block 217). However, the first connection attempt fails. The customer 210 again attempts to establish connection with VM 170 (block 219). In the example, the second connection attempt is successful. In some instances, multiple connection attempts may fail, which is one of the layers or points of failure associated with the traditional flow of executing a workload in a VM 170. Failed connection attempts may be common when the VM's OS (e.g., guest OS 196) is initializing, which the customer 210 may be unaware of. For example, the customer 210 typically is unaware of the VM's progress during initialization unless other costly and error prone mechanisms are applied to monitor the VM's progress.

After connection is established, the flow continues to workload deployment and execution (block 225). In the illustrated example, the customer copies the workload 230 to the VM 170 (block 227). After copying the workload 230 to the VM 170, the customer 210 executes the workload (block 229) and monitors the workload (block 231). However, before executing the workload, determining the state of the VM 170 may be required. For example, after connection is established at (block 219), the VM 170 may be probed for its state to ensure that the VM 170 is up and running before the workload 230 is deployed or execution of the workload 230 begins. Furthermore, as illustrated in FIG. 2A, as the workload 230 is executing, constant monitoring and communication between the customer 210 and the VM 170 may be necessary to ensure successful execution of the workload 230.

After the workload 230 executes, the flow continues to results retrieval and shutdown (block 235). For example, the customer 210 may retrieve workload results from the VM 170 (block 237). After retrieving the workload results, the customer 210 may send a request to the hypervisor to destroy the VM 170 (block 239). The workload results obtained in the traditional flow illustrated in FIG. 2A may be susceptible to damage while the VM 170 is running and may also be susceptible to damage or destruction when the VM 170 is shut down or destroyed.

Figure 2B:
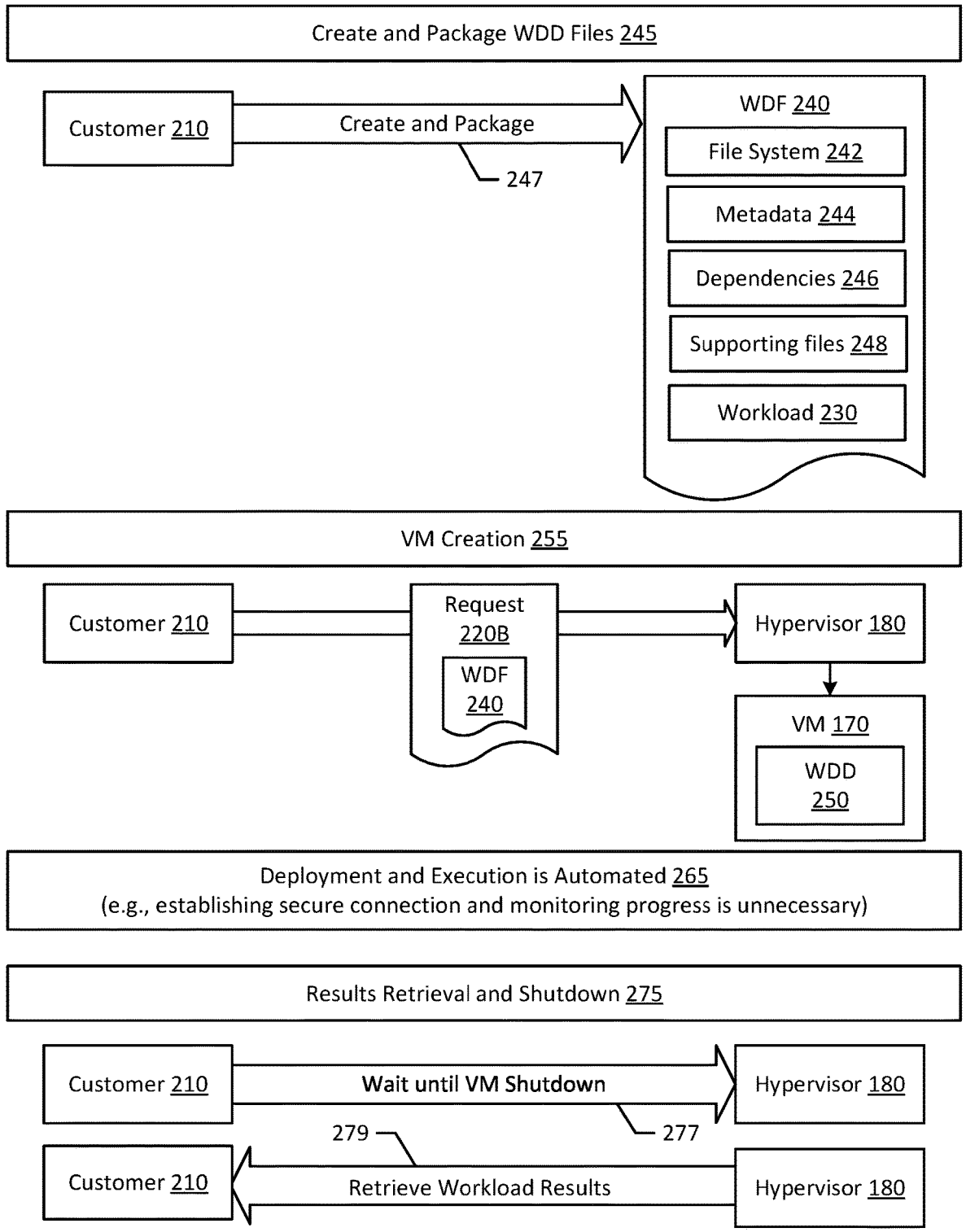

FIG. 2B illustrates a block diagram illustrating an optimized flow of executing a workload in a VM 170. As illustrated in FIG. 2B, the flow begins with creation and packaging workload definition device (WDD) files (block 245). For example, a customer 210 may create and package a workload definition file (WDF) 240 (block 247). The WDF 240 is associated with a workload and describes the workload. An example WDF 240 may be "/path/to/wdf.img". Additionally, the WDF 240 is packaged such that the WDF 240 is seen as a WDD by the VM's OS or in other words the WDF 240 may be configured to generate a WDD (according to the guest's perspective). The WDF 240 is seen from the client's or customer's side and made available to the hypervisor 180. Once the WDD 250 is generated, the WDD 250 is the device that is made available to the VM 170. For example, the WDD 250 may be seen by the VM's OS (e.g., guest OS 196) as a disk device that contains a workload definition, such as a Small Computer System Interface ("SCSI") disk. For streamlined operations and transparency from the point of view of the hypervisor 180, the WDF 240 preferably contains data that is recognizable and easily readable by the VM's OS (e.g., guest OS 196), such as a file system in a format such as the third extended file system ("ext3"), the extended file system ("xfs"), the New Technology File System ("NTFS"), etc. The file system 242 may include files and directories such as those described below.

In the illustrated example, the WDF 240 may include a file system 242 with metadata 244, dependencies 246, other supporting files 248, the workload 230, and any other images or libraries to generate a WDD capable of automatically executing the workload 230. After the WDF 240 is packaged, the flow continues to VM creation (block 255). For example, the customer 210 may send a request 220B to a hypervisor 180 to create VM 170. The request 220B may include the WDF 240. As noted above, the WDF 240 may be "/path/to/wdf.img" and the request 220B to the hypervisor 180 may be "please attach file /path/to/wdf.img as an SCSI disk" into the VM 170. When created, the VM 170 includes the WDD 250 generated from the WDF 240. For example, the hypervisor 180 allows a disk image to be hot-added or hot-plugged into the VM 170 such that the WDD 250 can be deployed within the VM 170. From the VM's OS (e.g., guest OS 196), the WDD 250 may be a new SCSI disk containing an ext4 file system with the metadata 244, dependencies 246, etc. described above.

As illustrated in FIG. 2B, deployment and execution is automated (block 265), such that establishing a secure connection and monitoring progress (as illustrated in FIG. 2A) is unnecessary. Specifically, unlike the flow illustrated in FIG. 2A, implementing the workload 230 as a WDD 250 advantageously allows the workload 230 to execute without constant monitoring and communication between the customer 210 and the VM 170. The workload 230 may include an executable, which may include instructions or commands that form all or part of the workload 230. Upon deployment of the WDD 250 within the VM 170 and confirming that execution criteria are met, the VM's OS automatically executes the defined workload 230.

In an example, the VM 170 or guest may be configured to generate a "generic" response to new devices (e.g., WDD 250) being added to the VM 170. The VM 170 may be configured by leveraging service managers such as "systemd" and kernel device handling system(s) and techniques such as "udev" to create a "generic" configuration, such that when the following occur, the workload 230 automatically executes. In one particular example, when each of the following events occur, the workload 230 may automatically execute, such as (a) a device of a certain type is added (e.g., a block device), (b) the device contains a serial number (or similar type of identifier) that marks the device as a workload candidate, (c) the device contains a file system with (1) a file containing metadata further binding and authenticating the device to a specific virtual machine (e.g., VM 170) and (2) the workload executable entry point. Specifically, once conditions or events (a), (b), (c)(1) and (c)(2) are met, the workload 230 may automatically execute without any additional communication from outside of the VM 170.

After the workload 230 executes, the flow continues to results retrieval and shutdown (block 275). For example, the customer 210 may wait for the VM 170 to shutdown (block 277) and then the customer 210 may retrieve workload results from the hypervisor 180 (block 279). In an example, the customer 210 may also retrieve the workload results from the VM 170. After retrieving the workload results, the VM 170 may be shut down so that a clear signal of execution completion is given to the customer 210 that requested execution of the workload 230. Shutting down the VM 170 also may include closing the WDD 250 and by doing so, if the WDD 250 is also serving as an output device for the results of the workload 230, the device is closed and prevented from having its contents altered or damaged. Specifically, by shutting down the VM 170 and closing the WDD 250, the output or results from executing the workload 230 are maintained in their saved state without the risk of alterations or damage that may occur if the WDD 250 continues running. Furthermore, the optimized flow illustrated in FIG. 2B further protects the workload output because the WDD 250 is not the primary disk for the VM 170 and thus destroying the VM 170 may not have an impact on the contents of the WDD 250 other than ensuring that other entities are prevented from opening the WDD 250 for writing.

Other "auto-run" or automatic execution techniques, e.g., an "auto-run" CD or DVD, are typically used by humans in desktop systems and are often limited to running content on the device itself (e.g., the PC with the CD or DVD) whereas the WDF and techniques described herein may contain a reference to an application that already exists in the VM 170. Furthermore, the "auto-run" techniques do not have the capability of acting as output devices. For example, "auto-run" CD(s) and DVD(s) are read only devices. Furthermore, unlike the systems, methods and techniques disclosed herein, the "auto-run" CD(s) and DVD(s) are unable to authenticate themselves with a VM 170. Therefore, the systems, methods and techniques disclosed herein provide several advantages over other "auto-run" technologies by providing output capabilities and authentication capabilities.

Specifically, the systems, methods and techniques disclosed herein advantageously allow for disconnected interactions with VM(s) 170 for running workloads. Features available to hypervisors 180 may be used to define characteristics of the VM 170 and limit execution of the WDD based on a validation of the WDD's content against the pre-defined characteristics of the VM 170 (e.g., execution criteria). In some instances, running or executing a workload on a completely disconnected VM 170 may be a requirement for security purposes. Furthermore, running or executing a workload on a completely disconnected VM 170 may advantageously provide a testing platform to test an application without external interference from the network. For secure applications, because the VM(s) 170 are disconnected, external attackers may advantageously be prevented from influencing entropy generated from network packets, which may otherwise be used to influence cryptography operations used in secure routines. In one specific example, the techniques disclosed herein may advantageously provide a more secure method of running batch or server-less microservices, workers, or instances for distributed applications. In the examples described herein, interactions with the VM 170 may be solely based on the creation of a device (e.g., WDD 250) with a correct workload or payload, which may be configured through various authentication criteria.

In traditional flows (see FIG. 2A), where networking is required, a custom setup of the VM's devices as well as specific network configurations are often required, which negatively affects the scalability of such solutions. For example, with the traditional flow (see FIG. 2A), the VM's devices may require a custom setup such as a unique MAC address for network devices as well as a specific network configuration for the OS. However, the custom setup described above may negatively affect scalability with regards to network addressing and traffic limits.

However, in the optimized flow (see FIG. 2B), direct network contact between the customer 210 or client and the VM is unnecessary, and the client may be protected even if networking is enabled on the VM 170. For example, the VM 170 may have connectivity to other outside systems, devices and networks via a network channel, but the connectivity provided by the network channel and the respective communications may still be prevented from reaching the client, thereby affording the client additional protections.

It should be appreciated that the optimized flow illustrated in FIG. 2B may be adapted to utilize pre-existing VM(s) 170 and thus may eliminate the VM creation step illustrated at block 255. For example, instead of creating and booting the VM 170 from scratch, the state of a previously initialized VM may be restored, and then a WDF 240 or WDD 250 may be added to the pre-existing VM 170 with its restored state. Additionally, because networking is not required in the optimized flow, the VM 170 may be the same (e.g., no new mac addresses or IP addresses configured at VM boot time) VM used to execute other workloads, with the only difference being the WDF 240 or WDD 250 for the present workload. Implementing the optimized flow illustrated in FIG. 2B with existing VM(s) 170 and restoring the VM's state is described in more detail with respect to FIGS. 4A and 4B.

Figure 3:
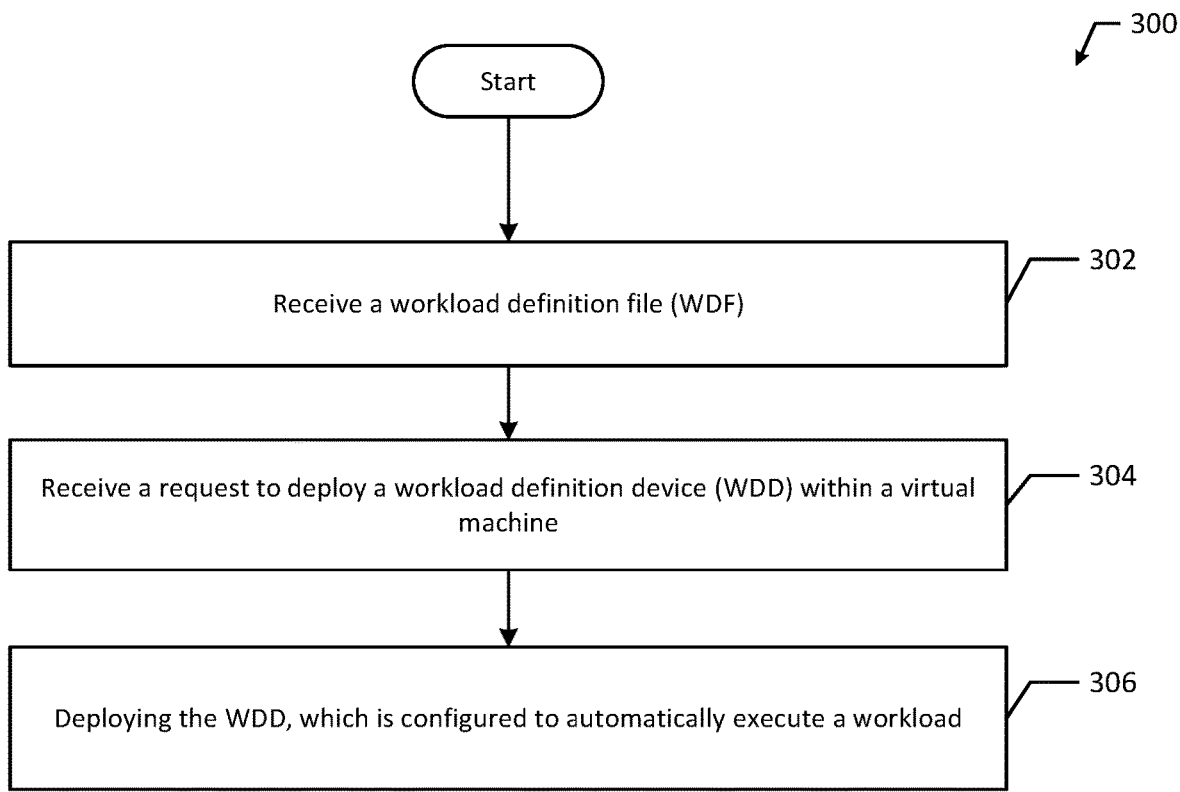
FIG. 3 illustrates a flowchart of an example process for injection and execution of a workload in a virtual machine according to an example embodiment of the present disclosure.

FIG. 3 illustrates a flowchart of an example method 300 for performing injection and execution of a workload in a virtual machine in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes receiving a workload definition file (WDF) (block 302). In an example, a hypervisor 180 receives the WDF (e.g., WDF 240 of FIG. 2B, referred to generally as WDF 240 when describing method 300). The WDF 240 may be associated with a workload (e.g., workload 194A-B of FIG. 1, referred to generally as workload 194 when describing method 300). The WDF 240 may be packaged such that the WDF 240 is configured to generate a workload definition device (WDD) (e.g., WDD 165A-B of FIG. 1 or WDD 250 of FIG. 2B, referred to generally as WDD 165 when describing method 300).

Method 300 also includes receiving a request to deploy a workload definition device (WDD) within a virtual machine (block 304). For example, the hypervisor 180 may receive a request (e.g., request 220B of FIG. 2B, referred to generally as request 220 when describing method 300) to deploy the WDD (e.g., WDD165 of FIG. 1) within a virtual machine 170. Additionally, method 300 includes deploying the WDD, which is configured to automatically execute a workload (block 306). For example, the hypervisor may deploy the WDD 165 within the VM 170. The WDD 165 may be configured to automatically execute the workload (e.g., workload 194 of FIG. 1) responsive to meeting an execution criteria. In an example, the execution criteria may include a confirmation that (i) the WDD 165 is a first type, (ii) the WDD 165 includes a predetermined identifier marking the WDD 165 as a workload candidate, (iii) the WDD 165 includes a file system having authentication data that binds the WDD 165 to the VM, (iv) the WDD 165 includes a workload executable entry point, or any combination thereof.

Specifically, the VM(s) 170 (e.g., VM 170A-B of FIG. 1) may be programmed to detect specific events, devices or device events. These events, devices or device events may be logged (along with associated timestamps) in a log file for confirmation that authentication criteria have been met. In an example, the VM 170 may include a script that is triggered once one or more execution criteria are met, and the script may be configured to automatically execute the workload.

The types of the WDD 165 may include a type of device, such as a block device or a type of file system associated with the WDD 165. For example, the WDD 165 may be a file system (in the block device) of a given file type (e.g., fourth extended filesystem ("ext4")). In an example, a block device may have a subsystem attribute, which identifies that the WDD 165 is a "block" device. For example, the subsystem attribute for the WDD 165 may be (SUBSYSTEM=="block").

The predetermined identifier marking the WDD 165 as a workload candidate may be a serial number, manufacturer or owner, vendor ID and product ID numbers, device attributes, etc. The authentication data binding the WDD 165 to the VM 170 may include In an example, the authentication data may be a measurement, such as a cryptographic measurement or a hash associated with the WDD 165. The cryptographic measurement or hash may include measurements or calculations based on the files, executable code, images, configurations, etc. of the WDD 165. For example, components or files of the WDD 165 may be measured either individually or collectively by computing the hash values of byte arrays representing the components or files. In a more specific example, the cryptographic measurement may include a measurement value that is a hash value of the files associated with the WDD 165. The measurement or hash may represent a fingerprint of the WDD 165 and may then be used as authentication data to decide if the WDD 165 meets the authentication criteria.

The cryptographic measurements or hash computations may utilize hashing functions such as the Secure Hash Algorithm ("SHA") (e.g., SHA-128, SHA-256, etc.) or other hashing functions such as MD5. Additionally, the encryption and decryption processes associated with the cryptographic measurement or hash computations may be performed according to the Advanced Encryption Standard ("AES").

The workload executable entry point may be where the first instructions of a program or a script are executed and where the program or script has access to command line arguments. For example, to start a program's execution, a loader or an OS may pass control to the entry point. Passing control to the entry point marks a transition from load time to run time. In some examples, the entry point may be a runtime library, a memory address (e.g., an absolute address or a relative address, such as an offset), a first statement in simple executable formats and boot loaders, etc. In Java Virtual Machine ("JVM") languages, such as Java, the entry point may be a static method.

Figure 4A:
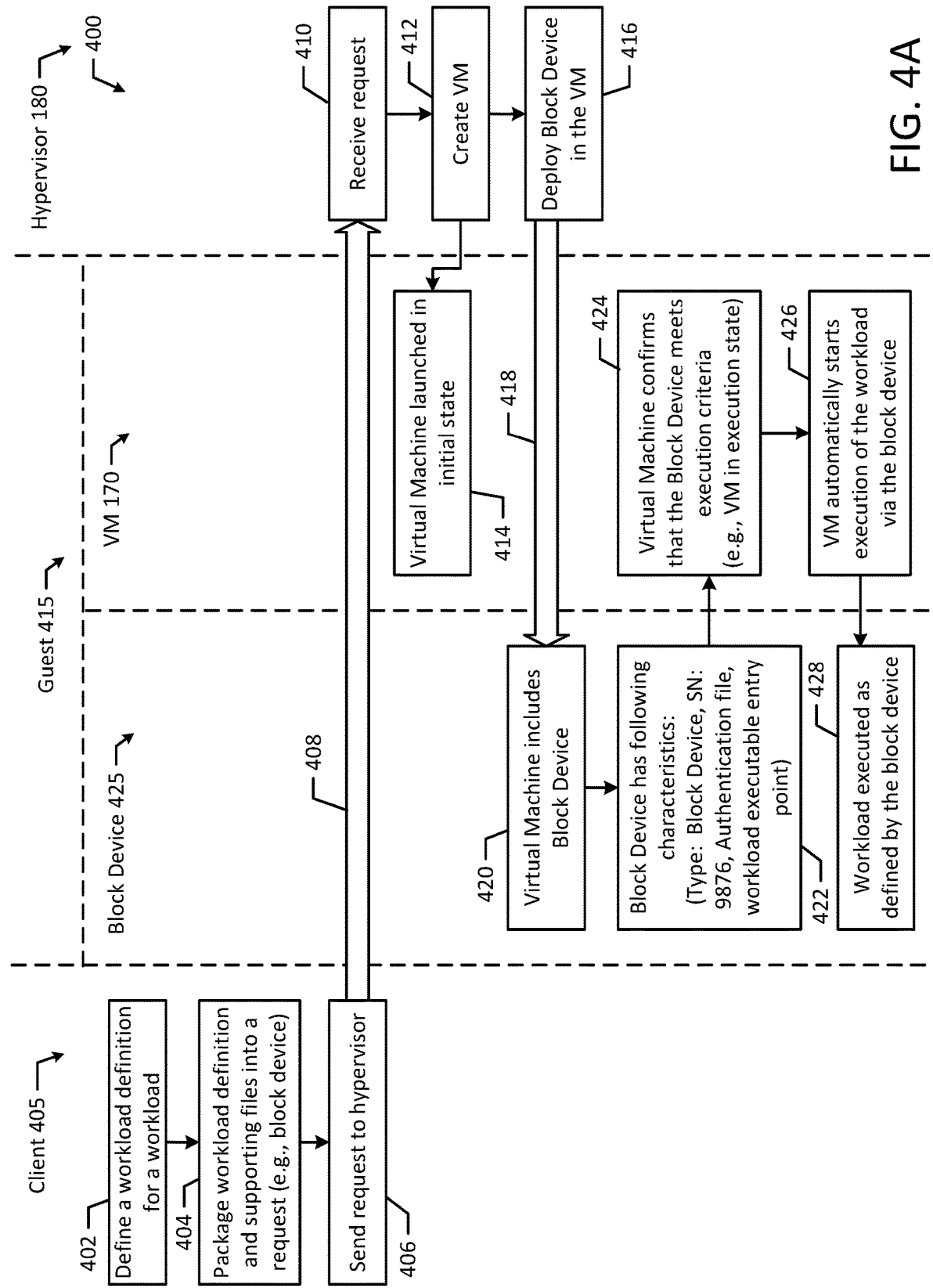
FIGS. 4A and 4B illustrate a flow diagram of an example process for performing injection and execution of workload (s) into virtual machines according to an example embodiment of the present disclosure.
Figure 4B:
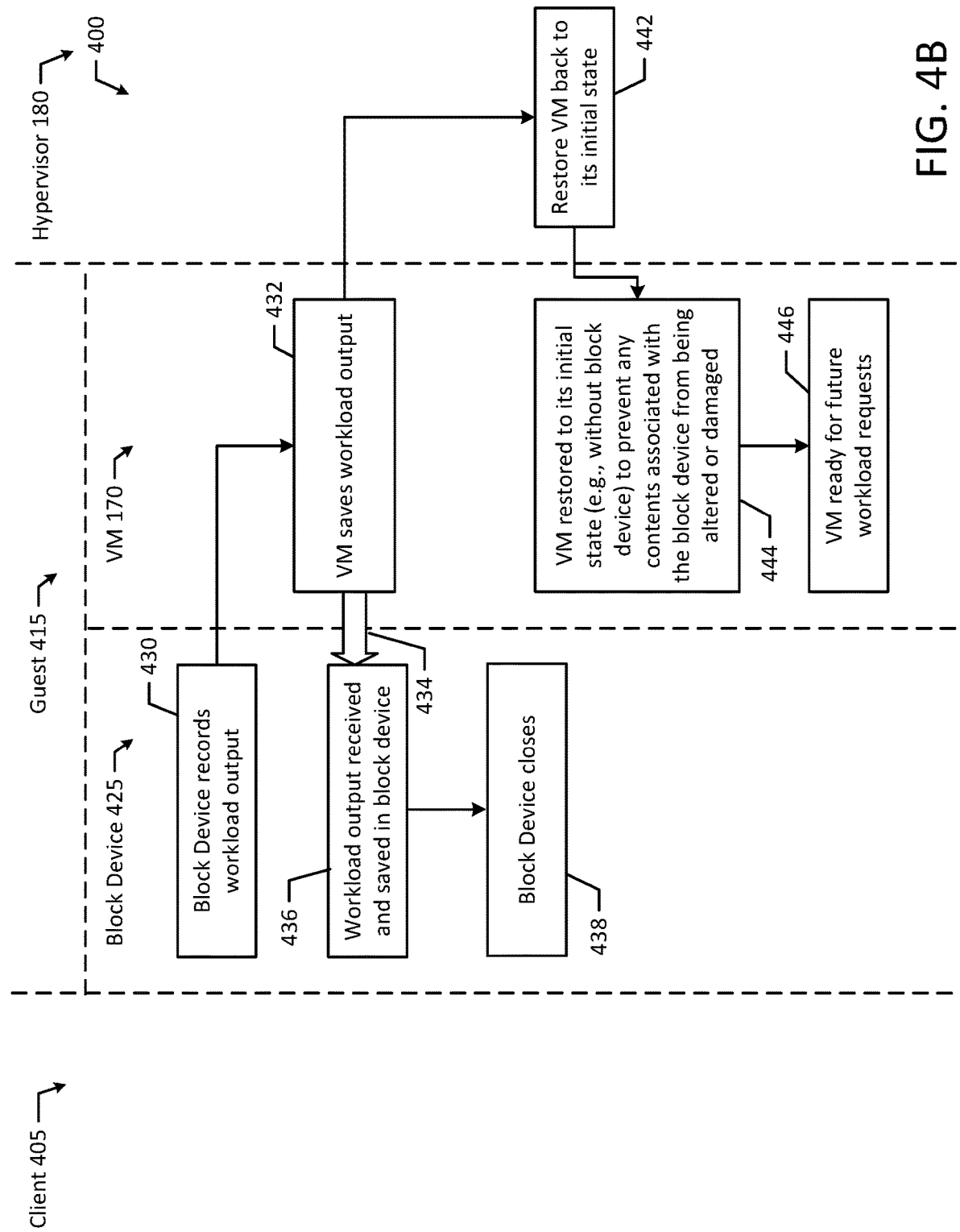

FIGS. 4A and 4B depicts a flow diagram illustrating an example method 400 for performing injection and execution of workload(s) into virtual machines according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuity, dedicated logic, etc.), software, or a combination of both. For example, a client 405 may communicate with a hypervisor 180, which may communicate with a guest 415 to perform example method 400.

In the illustrated example, a client 405 may define a workload definition for a workload (block 402). Specifically, the client 415 may define the workload or create a workload definition for the workload, such that the workload is configured to be executed in terms of a device. For example, the workload may be defined with specific attributes and associated with certain executables and supporting data files such that when executed, the workload executes in terms of an output device. The defined workload or workload definition may be provided as a workload definition file (WDF) (e.g., WDF 240 of FIG. 2B) for the workload (e.g., workload 193 of FIG. 1). Then, the client 405 may package the workload definition and supporting files (e.g., all of the files configured to make up and generate the block device 425) into a request 408 (block 404). For example, the client 405 may package WDF (e.g., workload definition and supporting files) such that the WDF is configured to generate a workload definition device (WDD) (e.g., WDD 250 of FIG. 2B). Specifically, the WDF is configured to generate the WDD in the sense that the WDF is interpreted as the WDD when attached to the VM 170 by the hypervisor 180. In the illustrated example, the WDF (e.g., WDF 240 of FIG. 2B) may be packages as a block device 425 that is associated with request 408. By packaging the workload in such a way, requirements for running or executing the workload may be reduced to an ability to package the files, for example as a block device with a file system containing the executables and supporting data files. Once properly packaged, the workload may be configured for automatic execution (e.g., upon meeting certain execution criteria) without any other outside or external communications or external requirements. In an example, the WDF 240 may be packaged as the WDD 250. Then, the client 405 may send the request 408 to a hypervisor 180 (block 406). For example, the request 408, which includes the block device 425 may be sent to the hypervisor 180. In some cases, sending the block device 425 may serve as the request 408. Specifically, the request 408 may be the block device 425, the WDF or another WDD.

The hypervisor 180 receives the request 408 (block 410). For example, the hypervisor 180 may receive the request 408 and associated block device 425. In an example, the request may be sent and received through a secured communication channel, such that the request 408 is encrypted. After receiving the request 408, the hypervisor 180 creates a VM 170 (block 412). For example, receiving the request 408 may trigger the hypervisor 180 to create the VM 170. In another example, the VM 170 may already exist and receiving the request 408 may instead trigger the VM 170 to deploy the block device 425 associated with the request. In some instances, where the request 408 is encrypted, the hypervisor 180 may use various decryption techniques to decrypt the request 408 before creating VM 170. Upon creation, the VM 170 is launched in an initial state (block 414). The initial state may be representative of the state the VM 170 is in before the block device 425 is attached, before a workload is executing, before the VM 170 is configured for a specific purpose, or before any other devices are associated with the VM. For example, in the illustrated example, the initial state is the state of the VM 170 immediately after the VM 170 is launched.

Then, the VM 170 deploys the block device 425 in the VM 170 (block 416). In an example, the block device 425 may be deployed within the VM 170 by attaching the block device 425 to the VM 170. Specifically, the block device 425 may be deployed by creating addition storage by writing a disk element in a new file and attaching the block device 425 to the VM 170, e.g., using an attach-disk command. As illustrated in FIG. 4A, deploying the block device 425 is represented as arrow 418, but hereinafter the block device will be referred to as block device 425. Once deployed, the virtual machine includes the block device 425 (block 420). The block device 425, which is one illustrative example of a WDD (e.g., WDD 250 of FIG. 2B), may be configured to automatically execute the workload responsive to meeting execution criteria. By configuring the block device 425 in such a manner that allows for automatic execution of the workload, the methods and techniques described in FIGS. 4A and 4B advantageously reduces the complexities and layers of communication and probing often required to execute a workload within a VM 170. For example, traditional approaches may require (i) establishing an active connection, such as a connection based on remote access protocols like SSH, (ii) probing the VM 170, such as continuously sending a communication to the VM 170, for its state, and (iii) continuously monitoring the VM 170 and receiving a response from the VM regarding its state. Conversely, the method 400 described in FIGS. 4A and 4B advantageously eliminates several of the associated layers or points of failure associated with (i), (ii) and (iii) described above thereby providing a method for injection and execution of a workload that is less error prone and that consumes less resources (e.g., less resources used for establishing, maintaining and monitoring communications between a customer or client 405, the hypervisor 180 and the VM 170.

In the illustrated example, the block device 425 has various characteristics, such as a type (e.g., Type: Block Device), a serial number (e.g., SN: 9876), an authentication file, and a workload executable entry point (block 422). The authentication file may include a hash or may be authenticated using a hash as previously discussed via various cryptographic measurement techniques. In an example, the authentication file may be associated with a hash of the various characteristics, such as the serial number along with other device attributes. The executable entry point may be an address (e.g., a memory address), a runtime library, a statement in an executable script or code, or a method. The VM 170 confirms that the block device 425 meets execution criteria (block 424). The VM 170 may confirm that the block device 425 meets the execution criteria by ensuring the hash or cryptographic measurements match an expected value. In another example, the block device 425 may meet the execution criteria by confirming authenticity of the authentication file.

After determining that the block device 425 meets the execution criteria, the VM 170 automatically starts execution of the workload via the block device 425 (block 426). For example, the block device 425 may include a script that allows for automatic workload execution once the execution criteria are met. In another example, the VM 170 may be configured in such a manner that the VM 170 initiates automatic execution of the workload once the execution criteria are met. Then the workload is executed (e.g., by the VM 170) as defined by the block device 425 (block 428). Specifically, the block device 425 defines the workload, which may be automatically executed by the VM 170 without further communication from the client 405 or hypervisor 180. As noted above, injecting the workload via the block device 425 and automatically executing the workload is advantageously less error prone and consumes less resources (e.g., less resources used for establishing, maintaining and monitoring communications between a customer or client 405, the hypervisor 180 and the VM 170) than traditional approaches.

Continuing at FIG. 4B, the block device 425 records an output of the workload (block 430). For example, the block device 425, which is a WDD, may be an output device such that the block device is configured to record any output(s) generated by the workload. Specifically, the block device 425 may record and save any output(s) generated by the workload as the workload executes. In the illustrated example, the VM 170 saves the output (e.g., workload output 434) (block 432). In an example, the VM 170 may save the workload output 434 to the block device 425. The VM 170 may save the workload output 434 after receiving the workload output 434 from the block device 425. Alternatively, the block device 425 may directly save the recorded workload output 438.

After the workload output 434 is saved in the block device 425 (block 436), the block device 425 closes (block 438). The block device 425 may also be configured to close responsive to the workload completing execution. In some examples, workload execution completion may be after confirmation is received that the recorded workload output 434 is saved. The client 405 may be aware of the VM 170 finishing execution or the block device closing and may then retrieve the workload output 434 that was saved to the block device 425. In an example, the workload output 434 may be in the same format as the block device 425. Specifically, the workload output 434 may be a block device. If the workload output 434 is saved on the same machine, sending and receiving the workload output 434 may not require any additional actions (e.g., a "no-action" direct access event). Furthermore, by providing the results or the workload output 434 in the same file or device (e.g., block device 425), the techniques disclosed herein may advantageously allow the participants to attest that the workload output 434 corresponds to the original request. For example, the WDF or WDD, such as the block device 425, may still contain its original file system plus any output directories associated with the workload output 434, which advantageously allows the client to ensure that the results (e.g., workload output 434) are un-mistakenly from the original WDF (e.g., block device 425) sent with the request 408.

After the VM 170 saves the workload output 434, the hypervisor 180 may restore the VM 170 back to its initial state (block 442). Specifically, the VM 170 is restored to its initial state (e.g., without the block device 425) to prevent any contents associated with the block device 425 from being altered or damaged (block 444). By restoring the VM 170 to its initial state instead of creating a VM 170 for every workload request additional computational resources may be conserved. For example, by attaching block devices 425 to already running virtual machines (e.g., VM 170), the VM(s) may only need to be launched a single time instead of each time a workload request is received. Additionally, instead of constantly shutting down or killing the VM 170 upon completion of workload execution, the VM 170 may be returned to its previous state thereby avoiding the computational resources and time involved in killing and then restarting VM 170. Now, the VM 170 is ready for future workload requests (block 446). For example, the VM 170 may handle hundreds of workload requests before being shut down instead of launching and killing hundreds of different VM(s) 170.

Figure 5:
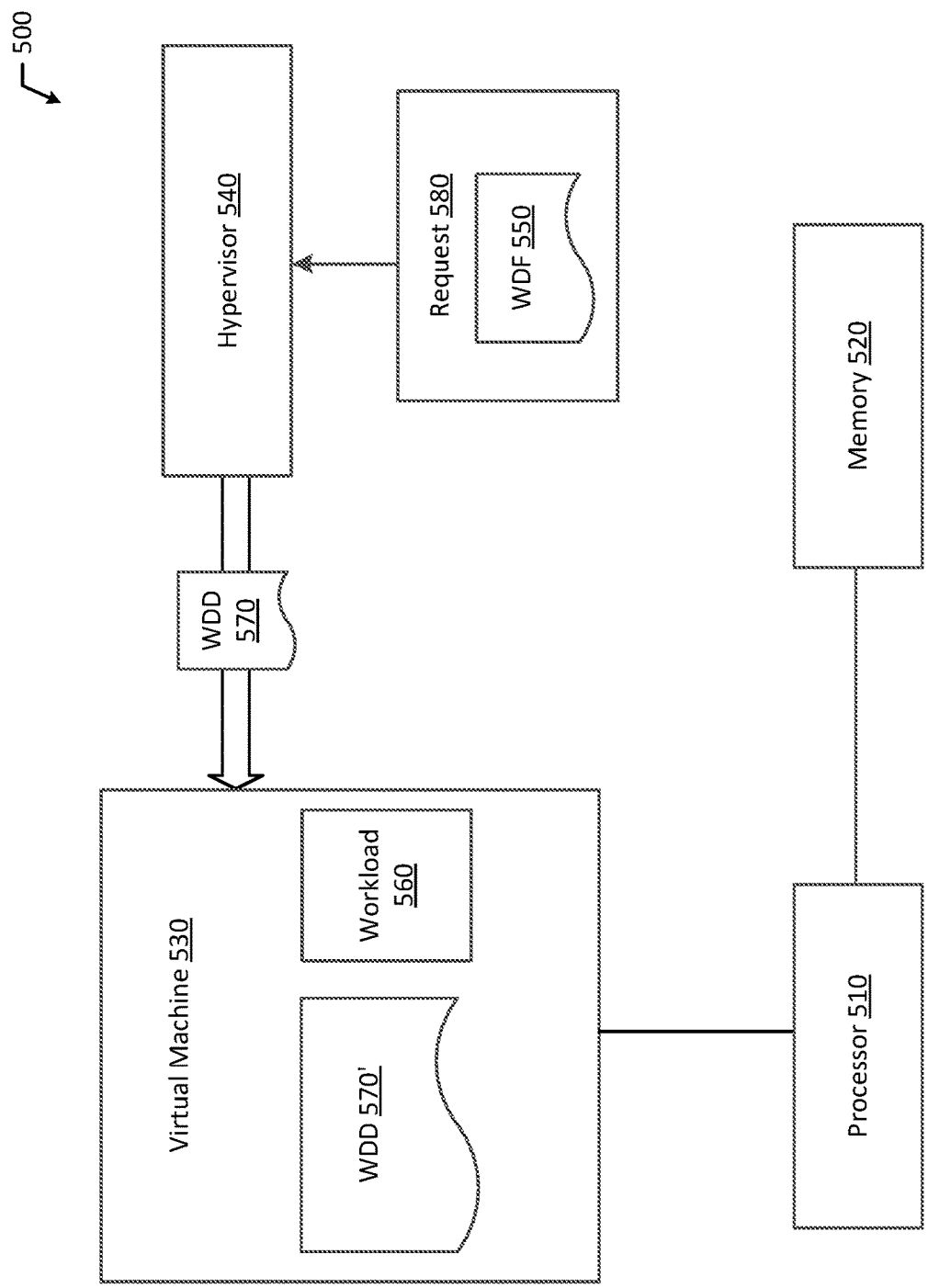
FIG. 5 illustrates a block diagram of an example workload injection and execution system according to an example embodiment of the present disclosure.

FIG. 5 is a block diagram of an example workload injection and execution system 500 according to an example of the present disclosure. The workload injection and execution system 500 may start and execute workloads automatically without probing the virtual machine for its state and without establishing an active connection with the virtual machine throughout execution.

As illustrated in FIG. 5, the workload injection and execution system 500 includes a processor 510 in communication with a memory 520. Additionally, the system 500 includes a virtual machine 530 running on the processor 510 and a hypervisor 540. The hypervisor 540 is configured to receive a workload definition file ("WDF") 550. The WDF 550 may be associated with a workload 560, and the WDF 550 may be packaged such that the WDF 550 is configured to generate a workload definition device ("WDD") 570. Additionally, the hypervisor 540 is configured to receive a request 580 to deploy the WDD 570 within the virtual machine 530. In the illustrated example, the request 580 includes the WDF 550. Additionally, the hypervisor 540 is configured to deploy the WDD 570 within the virtual machine 530. The WDD 570 is configured to automatically execute the workload 560 responsive to meeting at least one execution criteria 590.

The workload injection and execution system 500 advantageously allows for disconnected interactions with VM(s) 530 while automatically running and executing workload(s) 560, which provides security benefits and an improved testing platform free from interferences from external networks. The system 500 may be particularly useful or beneficial for running batch or server-less microservices, workers, or instances for distributed applications.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without dimin- The invention is claimed as follows:

1. A system comprising:
    a processor in communication with a memory;
    a virtual machine running on the processor; and
    a hypervisor configured to:
        receive a workload definition file ("WDF"), wherein
            the WDF is associated with a workload, and
            the WDF is packaged such that the WDF is configured to generate a workload definition device ("WDD");
        receive a request to deploy the WDD within the virtual machine, wherein the request includes the WDF, wherein the virtual machine is a pre-existing virtual machine that is running at a time the request is received, and wherein the virtual machine is in an initial state at the time the request is received; and
        deploy the WDD within the virtual machine, wherein the WDD is configured to automatically execute the workload responsive to meeting at least one execution criteria wherein the hypervisor is configured to deploy the WDD within the virtual machine by:
            locating the virtual machine according to the request, and
            attaching the WDD to the virtual machine, wherein the virtual machine is in a workload execution state after the WDD is attached.

2. The system of claim 1, wherein the WDD is configured to automatically execute without further interaction between an agent and the WDD.

3. The system of claim 2, wherein the agent is at least one of the hypervisor, an owner of the virtual machine, and a proxy representing a client or customer.

4. The system of claim 1, wherein the WDD is an output device.

5. The system of claim 4, wherein the WDD is configured to:
    record an output generated by the workload; and
    send the output to a receiver.

6. The system of claim 1, wherein the WDD is a block device with a file system containing at least one executable and at least one supporting file.

7. The system of claim 1, wherein the at least one execution criteria includes at least one of (i) the WDD is a first type, (ii) the WDD includes a predetermined identifier marking the WDD as a workload candidate, (iii) the WDD includes a file system having authentication data that binds the WDD to the virtual machine, and (iv) the WDD includes a workload executable entry point.

8. The system of claim 1, wherein the WDD is configured to close responsive to the workload completing execution.

9. A method comprising:
    receiving, by a hypervisor, a workload definition file ("WDF"), wherein
        the WDF is associated with a workload, and
        the WDF is packaged such that the WDF is configured to generate a workload definition device ("WDD");
    receiving, by the hypervisor, a request to deploy the WDD within a virtual machine, wherein the request includes the WDF, wherein the virtual machine is a pre-existing virtual machine that is running at a time the request is received, and wherein the virtual machine is in an initial state at the time the request is received; and
    deploying, by the hypervisor, the WDD within the virtual machine, wherein the WDD is configured to automatically execute the workload responsive to meeting at least one execution criteria, wherein deploying, by the hypervisor, the WDD within the virtual machine includes:
        locating, by the hypervisor, the virtual machine, according to the request, and
        attaching, by the hypervisor, the WDD to the virtual machine, wherein the virtual machine is in a workload execution state after the WDD is attached.

10. The method of claim 9, wherein deploying the WDD within the virtual machine includes:
    creating, by the hypervisor, the virtual machine according to the request, and
    attaching, by the hypervisor, the WDD to the virtual machine.

11. The method of claim 10, further comprising:
    responsive to the workload completing execution, closing the WDD; and
    shutting down, by the hypervisor, the virtual machine after the WDD closes.

12. The method of claim 9, further comprising:
    responsive to the workload completing execution, closing the WDD; and
    restoring the virtual machine back to the initial state.

13. The method of claim 12, further comprising:
    receiving, by the hypervisor, a second request to deploy a second WDD within the virtual machine;
    confirming, by the hypervisor, the virtual machine is in the initial state; and
    deploying, by the hypervisor, the second WDD within the virtual machine.

14. The method of claim 9, wherein the hypervisor deploys the WDD and the WDD automatically executes without further interaction between an agent and the WDD.

15. The method of claim 14, wherein the agent is at least one of the hypervisor, an owner of the virtual machine, and a proxy representing a client or customer.

16. The method of claim 9, further comprising:
    recording, by the WDD, an output generated by the workload; and
    sending, by the WDD, the output to a receiver.

17. The method of claim 9, wherein the at least one execution criteria includes at least one of (i) the WDD is a first type, (ii) the WDD includes a predetermined identifier marking the WDD as a workload candidate, (iii) the WDD includes a file system having authentication data that binds the WDD to the virtual machine, and (iv) the WDD includes a workload executable entry point.

18. The method of claim 9, further comprising:
    responsive to the workload completing execution, closing the WDD; and
    shutting down, by the hypervisor, the virtual machine after the WDD closes.

19. A non-transitory machine-readable medium storing code, which when executed by a processor is configured to:
    receive a workload definition file ("WDF"), wherein the WDF is associated with a workload, and the WDF is packaged such that the WDF is configured to generate a workload definition device ("WDD");
    receive a request to deploy the WDD within a virtual machine, wherein the request includes the WDF, wherein the virtual machine is a pre-existing virtual machine that is running at a time the request is received, and wherein the virtual machine is in an initial state at the time the request is received; and
    deploy the WDD within the virtual machine, wherein the WDD is configured to automatically execute the workload responsive to meeting at least one execution criteria, wherein deploy the WDD within the virtual machine includes:

locate the virtual machine, according to the request, and attach the WDD to the virtual machine, wherein the virtual machine is in a workload execution state after the WDD is attached.

\* \* \* \* \*